United States Patent Office 3,303,232
Patented Feb. 7, 1967

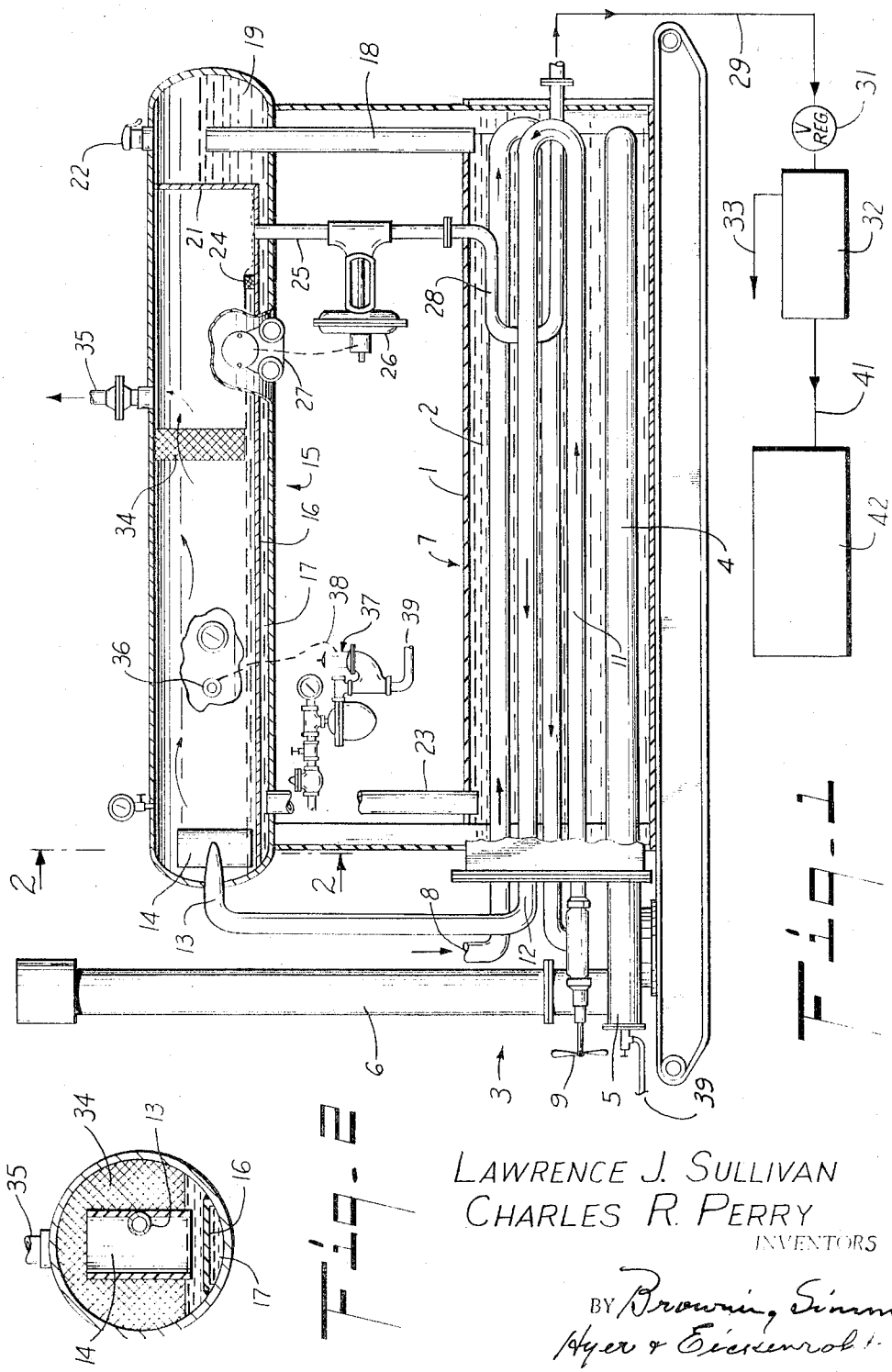

3,303,232
PROCESS FOR SEPARATING CONDENSED HYDROCARBONS FROM NATURAL GAS AND REDUCING PRESSURE ON THE GAS
Charles R. Perry and Lawrence J. Sullivan, both of P.O. Box 1152, Odessa, Tex. 79760
Filed June 26, 1964, Ser. No. 378,106
7 Claims. (Cl. 260—676)

This invention relates to improvements in processes for separating entrained condensate or "distillate" from streams of natural gas produced by gas wells, and lowering the pressure of such gas streams from well pressure to a pressure suitable for pipeline transportation.

Effluent streams of natural gas usually issue from gas wells at a very high pressure amounting to thousands of pounds per square inch. These streams contain droplets of condensed hydrocarbons entrained therein which must be separated from the gas before the gas passes to a pipeline transportation. The pressure of the gas also is normally too high for pipeline transportation and it is usually reduced to pipeline pressure before being sent to the transportation lines.

A great many types of separators and separating processes have been used for making the liquid-gas separation and reducing pressure in a single unit. U.S. Patent 3,119,674 describes a process and apparatus of this general type. Comparable processes and apparatus leave much to be desired. In some processes the separated liquid fraction contains sufficient dissolved gas that it is frequently necessary to install a small pumping unit to withdraw gas from a tank for holding separated condensate, to recompress the gas evolved from the liquid at atmospheric pressure to pipeline pressure, and to re-introduce it into the pipeline. Recovery of condensate also is frequently much lower than desirable for maximum economy.

It is an object of this invention to provide a process for the separation of a stream of natural gas containing entrained liquid condensate into substantially gas-free and liquid-free fractions.

Another object is to provide a process of the above type in which temperatures and fuel consumption are low.

Another object is to provide an improved process for separating condensate from streams of natural gas in which residual gas bubbles are squeezed from the condensate fraction by application of high centrifugal force.

Another object is to provide such process in which a thin layer of liquid is heated to remove residual dissolved gas and melt hydrates after centrifugal treatment.

Still another object is to provide a process of the above type in which recovery of condensate from the gas stream is high.

Other objects and advantages will become apparent to those skilled in the art from consideration of the following detailed description and the attached drawings.

In the resent invention these results are attained in a process wherein a body of heat exchange liquid is heated in a first heating zone and a stream of natural gas containing entrained liquid is passed through the heating zone in indirect heat exchange relationship with the heat exchange liquid as for example, through a coil of pipe immersed in the liquid. During the passage of the stream of gas through the heat exchange liquid pressure on the gas is reduced by use of a suitable choke or similar device and the stream of gas under reduced pressure is continued in indirect heat exchange relationship with the heated liquid. The temperature of the heat exchange liquid is maintained at a value so that at a selected rate of heat exchange determined by known factors for calculating heat exchange including length and wall thickness of pipe, volume of gas per second, etc., the temperature of the gas downstream of the point of expansion is below the temperature at which solid hydrates form in the gas. The temperature of the expanded gas stream is controlled according to the quantity of condensate entrained in the gas. For example, when the ratio of condensate to gas is in the range from 5 to 15 barrels per million cubic feet of gas, this temperature is preferably in the range from about 20 to 10° below that at which formation of solid hydrates occurs.

For higher ratios of condensate to gas such as 50 to 100 barrels of condensate per million cubic feet of gas the temperature of the expanded gas is maintained about 10° to 5° F. below the temperature at which solid hydrates form. Operation of the expanded gas at such low temperatures results in greater overall recovery of condensate than can be attained at higher temperatures.

The stream of expanded gas containing condensate and particles of solid hydrates is then passed to a means for exerting centrifugal force on the stream and the liquid and solid hydrates are separated from the gas by centrifugal force in the range from 25 to 500 G's, preferably 75 to 150 G's. This high degree of centrifugal force results in very complete separation of liquid and solids from the gas as any bubbles of gas entrained in this evaporated liquid are literally squeezed out of the liquid. This separation preferably is accomplished in a centrifugal separator located adjacent the entrance of a second heating zone at higher level than the first heating zone.

The separated liquid and gaseous fractions are passed together through this second heating zone in contact with each other. The liquid is distributed in a thin layer as it flows through this zone, and is heated during passage through the zone to a temperature about 20° or more higher than the gas with which it is in contact.

The relative volume and rates of flow of liquid and gas an the poor rate of heat transfer from liquid to gas enable these temperature relationships to be maintained. Heating the liquid in the thin layer in contact with the gas results in melting the hydrates and substantially complete removal of ethane and methane from the liquid together with propane. The upper heating zone is heated by convection circulation of heat exchange liquid from the first lower heating zone to the second upper heating zone and return.

An effluent of gas from which condensate has been removed is withdrawn from the upper heating zone and may be passed directly to a pipeline for transportation or to any other use as desired, and an effluent of condensate also is withdrawn. This condensate is substantially free from materials causing evolution of gas at atmospheric pressure, but if desired it may be further treated by passing the withdrawn condensate effluent from the upper heating zone in indirect heat exchange relationship with the heat exchange fluid in the lower or first heat exchange zone and withdrawing a heated effluent therefrom to a flash tank where the pressure on the condensate is reduced to atmospheric pressure. Usually a little more gas may be removed when the flash tank is used but the quantity is quite small and usually insufficient to supply fuel for the heater for the first heat exchange zone.

In the following detailed description one embodiment of my invention is described in detail together with one type of equipment suitable for carrying it out.

In the drawings, the reference numeral 1 designates a is shown schematically and in part diagrammatically, the FIG. 1 being a side elevation of a preferred heating separating device. FIG. 2 is a vertical section through the upper heating zone of the device of FIG. 1 on the line 2—2.

In the drawings, the reference numeral 1 designates a tank whose interior forms a first heating zone. Tank 1 is filled with a suitable heat exchange liquid 2 which preferably is water. A heater designated generally as 3 is located within tank 1 and adjacent to the bottom of the tank is illustrated as a horizontal U-shaped tube 4 having at one end, a burner 5, preferably gas fired, and at the other end communicating with an upright stack 6 for disposal of waste gases.

A coil of pipe designated generally as 7 is disposed in the heat exchange liquid in tank 1 and has an inlet end 8 connectible with a pipe for delivering a stream of gas from a well. A means for reducing pressure on gas flowing through the pipe 7, illustrated as a manually adjustable choke 9, is connected in the coil of pipe to provide a relatively short section 11 of the pipe downstream from the choke.

An outlet 12 of section 11 is connected to a pipe 13 disposed to conduct gas issuing from section 11 to a centrifugal separator 14.

The centrifugal separator 14 is located adjacent to the entrance of an upper heating zone designated generally as 15, and the lower edge of the centrifugal separator normally extends below the level of a thin layer of condensate flowing along a flat surface provided by an inverted channel iron 16 in indirect heat exchange relationship with heat exchange liquid 17 flowing beneath the channel iron.

A means for heating the upper heating zone by convection flow of hot heat exchange liquid from tank 1 is provided, comprising a pipe 18 connected to conduct hot liquid from tank 1 into a chamber 19 in an end of the upper heating zone opposite the centrifugal separator. The chamber 19 is divided from the remainder of the zone by a partition 21 which extends down to and into water-tight relationship with channel iron 16. Chamber 19 is provided with a fill cap 22 which may include a pressure relief valve if desired. Near the opposite end of the upper heating zone 15, a pipe 23 extends downward from the space below channel iron 16 to a lower part of tank 1, thus providing a complete path for convection flow of heat exchange liquid. No valving arrangement is necessary for controlling flow in pipes 18 and 23 and it is preferred that there be no obstruction of this type so that maximum unimpeded flow of heat transfer liquid be maintained at all times.

A weir 24 extends across channel iron 16 and is of such height as to retain a thin layer of condensate on the upper side of channel iron 16. Downstream of weir 24 a condensate outlet line 25 is provided containing a valve 26 which preferably is controlled by a liquid level responsive means 27. The type of liquid level responsive means is immaterial to the present invention and there are a great many of such devices on the market so that it is believed not necessary to describe any particular one in detail. These devices may vary from a simple float actuating a valve, to a liquid level responsive controller admitting gas under pressure into a diaphragm type valve.

It is preferred that the condensate outlet line have a section 28 downstream of the valve through which withdrawn condensate may pass in indirect heat exchange relationship with the heat exchange fluid in tank 1. Condensate issuing from this section 28 is then conducted by line 29 containing a pressure reducing valve 31 to a flash tank 32 at substantially atmospheric pressure. Any gas given off in tank 22 may be returned by line 33 to burner 5 or to any other use desired. The quantity of gas given off in tank 32, however, is normally insufficient to operate burner 5 and must be supplemented with gas from another source.

A mist extractor is disposed across the upper heating zone and fills a short section of the zone above the level of condensate provided by weir 24. A gas outlet 35 from the upper zone is provided at a point downstream from the mist extractor. It is preferred that a thermostat 36 of adjustable type be inserted in the upper heating zone above the level of liquid provided by weir 24 so that it will be responsive to gas temperature in this zone, and that a fuel controlling valve assembly designated generally as 37 responsive to thermostat 36, as indicated by the dotted line 38, be connected in a line 39 arranged to conduct fuel to burner 5.

In operation the inlet end of pipe coil 8 is connected to a pipe conducting an effluent of natural gas from a gas well. An effluent of this type always contains droplets of condensate and is frequently at a pressure in the range from about 3,000 to 6,000 pounds per square inch.

Incoming gas thus traverses the coil 7 immersed in a heat transfer liquid heated by the heater 3 to a temperature usually well below the boiling point of water. On passing through choke 9 the gas is expanded to pipe line pressure, usually in the range from about 300 to 800 pounds per square inch. This great expansion lowers the temperature of the gas to a value far below the temperature at which the formation of solid hydrates in the gas occurs. Section 11 of pipe 7 downstream from the choke 9 is surrounded by hot heat exchange liquid and heat transfer through the walls of the pipe in this section prevents accumulation of hydrates on the wall blocking the pipe. The velocity of the gas also is greatly increased by reduction in pressure, and the low temperature in section 11 results in very complete condensation of higher hydrocarbons.

The cold high velocity gas is then introduced substantially tangentially into a cylindrical centrifugal separator 14. This separator is of size selected to apply centrifugal force in the range from 25 to 500 times the force of gravity upon the stream of gas and condensed liquids rotating around the wall of the separator at high velocity.

Gas issues from the top of separator 14 and passes through the upper heating zone in contact with the surface of condensate flowing toward an outlet from the upper heating zone, passes through a mist extractor 34 and is withdrawn by a gas outlet 35 to pipeline transportation or other use as desired.

Condensed liquid flows spirally downward in separator 14 and drops out of the open bottom thereof to form a thin layer on a broad flat surface provided by inverted channel iron 16. The depth of this layer is maintained constant by weir 24. The thin layer of condensate is in indirect heat exchange relationship with hot heat exchange liquid flowing through the large space below channel iron 16.

Under these circumstances it is easy to maintain the liquid condensate at a temperature up to 20° F. or more higher than the stream of gas in contact therewith. This is due partly to the low rate of transfer of heat from liquid to gas and partly to the velocity of the gas stream which is sufficiently great that the gas passes through the upper heating zone before temperature equilibrium with the liquid is attained. This type of operation results in removal of substantially all hydrocarbon materials from the liquid which are gaseous at atmospheric pressure and normal temperatures. The separation of liquid and gas by the combination of the high degree of centrifugal force exerted in centrifugal separator 14 and subsequent heating of the separated liquid in contact with the separated gas fraction results in a substantially gas free liquid fraction. In some cases however it may be desirable to withdraw the liquid and further heat the withdrawn liquid in the first heating zone and pass the heated liquid to flash tank 32. Line 29 leading to flash tank 32 contains a pressure reducing valve 31 so that the pressure on the liquid delivered to the flash tank is substantially atmospheric.

At atmospheric pressure very small quantities of gas may be evolved from the liquid and withdrawn by line 33 to provide a part of the fuel requirements of burner 5, or any other use as desired. After a short holding period in the flash tank the liquid is withdrawn by line 41 into holding tank 42. The liquid in the tank 42 is then stable and does not give off any appreciable quantities of gas when held for long periods of time at atmospheric pressure.

In starting up the operation as described above, the adjustable thermostat 36 is set to control the degree of heating of the heat exchange fluid to a temperature which will result in a temperature in gas outlet 35 just above the temperature at which solid hydrates would form in the outlet gas stream. Since this temperature can be estimated only roughly for any particular well, the operator then lowers the setting of the thermostat at intervals until he reaches a temperature at which solid hydrates just begin to form in the outlet 35. The setting of the thermostat is then changed to control the flow of fuel to burner 5 by fuel control valve assembly 37 so that the temperature of gas in the outlet stream will be about 5° F. above that at which hydrate formation occurs. Under these circumstances the process will run for an indefinite length of time without attention from an operator, since variations in the well effluent are minor, and will not require change in temperature outside of the 5° range provided by the thermostat setting to prevent formation of hydrates in the outlet line.

It is preferred that the gas outlet temperature be as low as possible to provide complete recovery of liquid condensates and to condense all hydrocarbon materials which are normally liquid at atmospheric pressure.

From the foregoing, it will be seen that this invention is one well adapted to attain all of the ends and objects hereinabove set forth, together with other advantages which are obvious and which are inherent to the process and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A process for separating a stream of natural gas containing entrained liquid into substantially gas-free liquid and liquid-free gas fractions and lowering pressure on the fractions from substantially well pressure to a pressure suitable for pipeline transportation comprising the steps of heating a body of heat exchange liquid in a first heating zone; passing a stream of natural gas containing entrained liquid at well pressure through the heated body of heat exchange liquid in indirect heat exchange relationship therewith; reducing pressure on the stream of natural gas during said passage in indirect heat exchange relationship; maintaining the temperature of the heat exchange liquid at a temperature below a temperature resulting in hydrate formation in the stream of gas downstream of a point of reduction in pressure; separating liquid and solid hydrates from the gas by centrifugal force of 25 to 500 G's; heating the separated liquid containing solid hydrates in a second heating zone in contact with separated gas to a temperature sufficiently high to drive off substantially all materials normally gaseous at atmospheric pressure from the liquid; heating the second heating zone by convection circulation of heat exchange liquid from said first heating zone; and withdrawing the resulting gas and liquid fractions.

2. The process of claim 1 wherein the liquid fraction in the second heating zone is maintained at a temperature up to 20° F. above the separated gas fraction in contact therewith.

3. A process for separating a stream of natural gas containing entrained liquid into substantially gas-free liquid and liquid-free gas fractions and lowering pressure on the fractions from substantially well pressure to a pressure suitable for pipeline transportation comprising the steps of heating a body of heat exchange liquid in a first heating zone; passing a stream of natural gas containing entrained liquid at well pressure through the heated body of heat exchange liquid in indirect heat exchange relationship therewith; reducing pressure on the stream of natural gas during said passage in indirect heat exchange relationship; maintaining the temperature of the heat exchange liquid at a temperature below a temperature resulting in hydrate formation in the stream of gas downstream of a point of reduction in pressure; separating liquid and solid hydrates from the gas by centrifugal force of 25 to 500 G's; heating the separated liquid containing solid hydrates in a second heating zone in contact with separated gas to a temperature sufficiently high to drive off substantially all materials normally gaseous at atmospheric pressure from the liquid; heating the second heating zone by convection circulation of heat exchange liquid from said first heating zone; withdrawing the resulting gas and liquid fractions; and introducing the separated liquid fraction into a flash tank and holding it there until all perceptible gas evolution has ceased.

4. The process of claim 1 wherein the heat exchange liquid in the first heating zone is maintained at a temperature to provide temperature in the gas downstream of the point of reduction in pressure in the range from 5 to 20° F. below a temperature resulting in formation of solid hydrates in said gas.

5. The process of claim 4 wherein the stream of natural gas has an oil-to-gas ratio of 5 barrels per million and the temperature is maintained about 20° F. below that at which solid hydrates form in the gas.

6. The process of claim 4 wherein the oil-gas ratio in the stream of natural gas is about 50 barrels per million cubic feet of gas and the temperature downstream of the point of reduction of pressure is maintained about 5° below the temperature at which solid hydrates form in the gas stream.

7. The process of claim 1 wherein liquid and solid hydrates are separated from the gas by centrifugal force in the range from 75–150 G's.

References Cited by the Examiner

UNITED STATES PATENTS

| 2,747,002 | 5/1956 | Walker et al. | 260—676 |
| 2,768,118 | 10/1956 | Laurence et al. | 208—340 |
| 3,105,855 | 10/1963 | Meyers | 260—676 |
| 3,174,926 | 3/1965 | Walker et al. | 208—340 |

ALPHONSO D. SULLIVAN, *Primary Examiner.*